United States Patent
Noe et al.

(10) Patent No.: US 12,406,314 B1
(45) Date of Patent: *Sep. 2, 2025

(54) SYSTEMS AND METHODS ASSOCIATED WITH CASH POOLING

(71) Applicant: Wells Fargo Bank, N.A., San Francisco, CA (US)

(72) Inventors: James Christopher Noe, Charlotte, NC (US); Todd Douglas Simmel, Davidson, NC (US); Ken C. Kiernan, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/106,329

(22) Filed: Feb. 6, 2023

Related U.S. Application Data

(63) Continuation of application No. 16/994,236, filed on Aug. 14, 2020, now Pat. No. 11,574,369, which is a continuation of application No. 14/984,402, filed on Dec. 30, 2015, now Pat. No. 10,783,591.

(51) Int. Cl.
*G06Q 40/00* (2023.01)
*G06Q 40/12* (2023.01)

(52) U.S. Cl.
CPC .................... *G06Q 40/12* (2013.12)

(58) Field of Classification Search
None
See application file for complete search history.

(56) References Cited

U.S. PATENT DOCUMENTS

| | | | |
|---|---|---|---|
| 5,987,435 A | 11/1999 | Weiss et al. | |
| 6,119,946 A | 9/2000 | Teicher | |
| 6,467,685 B1 | 10/2002 | Teicher | |
| 7,340,427 B1 | 3/2008 | Cornell | |
| 7,895,098 B2 | 2/2011 | Beard | |
| 8,190,504 B1 | 5/2012 | Stolz et al. | |
| 8,255,301 B1 | 8/2012 | Willin et al. | |
| 8,255,307 B1 | 8/2012 | Beard | |
| 8,577,770 B2 | 11/2013 | Beard | |
| 10,783,591 B1 | 9/2020 | Noe et al. | |
| 2002/0178098 A1* | 11/2002 | Beard | G06Q 20/042 705/35 |
| 2005/0021434 A1 | 1/2005 | D'Loren | |
| 2009/0032588 A1 | 2/2009 | Hassenzahl | |
| 2010/0217869 A1 | 8/2010 | Esteban et al. | |
| 2012/0317020 A1 | 12/2012 | Beard | |
| 2014/0180962 A1* | 6/2014 | Fiala | G06Q 40/06 705/36 R |
| 2014/0229402 A1 | 8/2014 | Caron | |

OTHER PUBLICATIONS https://www.treasury-consulting.ch/e/cashpooling.htm.

* cited by examiner

*Primary Examiner* — Fateh M Obaid
(74) *Attorney, Agent, or Firm* — Foley & Lardner LLP

(57) ABSTRACT

Systems, methods, and other embodiments associated with cash pooling. According to one embodiment, a system includes an account logic configured to receive at least one change selected by a user and make the at least one change to a pool. The pool includes a plurality of accounts. The system further includes a settlement logic configured to calculate a balance for one or more accounts in the pool. The settlement logic is further configured to identify at least one settlement options for the one or more accounts based at least in part on the balance.

20 Claims, 8 Drawing Sheets

SYSTEMS AND METHODS ASSOCIATED WITH CASH POOLING

CROSS-REFERENCE TO RELATED APPLICATIONS

This application is a continuation of U.S. patent application Ser. No. 16/994,236, filed Aug. 14, 2020, and entitled "SYSTEMS AND METHODS ASSOCIATED WITH CASH POOLING," which is a continuation of U.S. patent application Ser. No. 14/984,402, filed Dec. 30, 2015, and entitled "SYSTEMS AND METHODS ASSOCIATED WITH CASH POOLING," the entirety of each of which are incorporated herein by reference.

BACKGROUND

Cash pooling enables a corporate entity to 'pool' the cash of its associated companies into one bank account. For example, each company of the corporate entity regularly transfers their surplus cash to the single bank account, and then draws funds to satisfy their own cash flow requirements. Such economies of scale help the corporate entity to minimize bank charges and maximize interest payments.

Cash pooling may be conducted by physically or virtually transferring the funds. Physical pooling is also referred to as zero balancing. Each company (e.g., division or subsidiary) maintains its own bank accounts, which are booked as sub-accounts linked to a parent account. Each division or sub account conducts its transactional business paying and receiving money. At the close of each business day, the net funds positions are physically transferred to the parent account. From there the net position in the main or parent account may be either invested, if there is excess cash, or funded through a credit facility.

The movements of money between the parent account and sub-accounts are treated as inter-company loans with the exception of movements that take place within the same legal entity. What may have been excess cash at the subsidiary account level is now considered a loan to the corporate entity. Funds advanced from the corporate entity to the subsidiary(s) to satisfy debit transaction needs are considered loans from the corporate entity to the associated companies. Compensatory rates are assigned to both sides of the money movement, and could differ, in order to provide for compensation for the funds movement. Due to the complexity of corporate entities and their hierarchical structure, accurately tracking the funds moving between the parent account and sub-accounts at a number of different rates can be convoluted at best.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of one element may be implemented as an external component of another element and vice versa.

DETAILED DESCRIPTION

Figure 1:
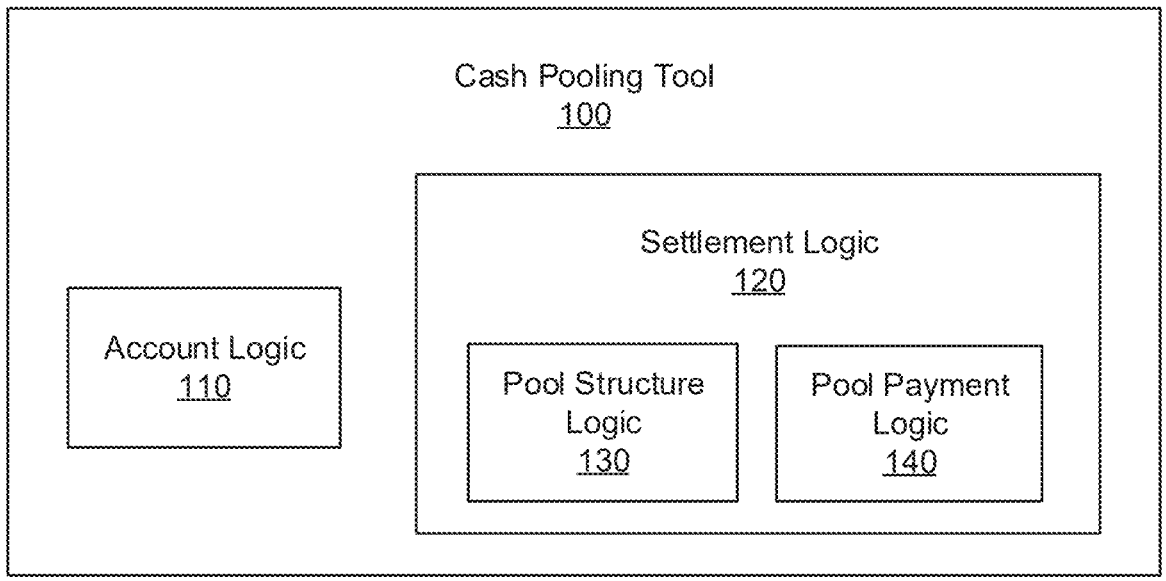
FIG. 1 illustrates one embodiment of a cash pooling tool associated with cash pooling.

Embodiments or examples illustrated in the drawings are disclosed below using specific language. It will nevertheless be understood that the neither embodiments nor examples are intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with cash pooling.

As discussed above, tracking the funds moving between the parent account and sub-accounts at a number of different rates can be exceedingly difficult. Corporate entities, particularly when executed on a global scale, have an interest in maximizing the availability of internal sources of capital. Cash pooling, is a cash management strategy that makes cash readily available. Cash pooling is accomplished through an arranged bank account structure that mimics corporate accounting treatment and offsets cash deficits with cash surpluses between companies associated with the corporate entity.

Described herein are examples of systems, methods, and other embodiments associated with a cash pooling tool. Specifically, the systems, methods, and other embodiments described herein provide for accounting capabilities as well as information reporting to clients that can be utilized to account for funds movement between companies within the pooling structure, investment activity, and compensatory payments. The cash pooling tool also provides information reporting. This allows customers to utilize cash pooling to account for funds movement between entities within their pooling structure, maximize investment opportunities for their cash positions, and self-manage their pooling setups and account settings.

FIG. 1 illustrates one embodiment of a cash pooling tool 100 associated with cash pooling. The cash pooling tool 100 may be incorporated with financial tools that a user utilizes to view, access, and manage accounts with a financial institution. For example, a financial institution may host the cash pooling tool 100 using systems including servers, databases, and other hardware. The cash pooling tool 100 may be accessed through networks and online capabilities. For example, a user may access the cash pooling tool 100 through online banking tools also provided by the financial institution.

As discussed above, the cash pooling tool 100 gives a user (e.g., account holder, customer, financial officer, corporate entity, subsidiary, etc.) the ability to manage accounts that are pooled together. For ease of use, the cash pooling tool 100 may be a graphical user interface that allows the user to manage the accounts remotely. The cash pooling tool 100 includes an account logic 110 and a settlement logic 120. The settlement logic 120 further includes a pool structure logic 130 and a pool payment logic 140.

The account logic 110 provides a self-administrable user interface for accounts within the user's pool, which allows the user to add, delete, and move accounts within the pool. Suppose that a corporate entity acquire a subsidiary. The user may use the account logic 110 to add one or more accounts associated with the subsidiary to the user's pool. Because the subsidiary may have accounts with previous balances, the account logic 110 provides the ability to establish an initial pooling position that can account for any previous balances associated with added or moved accounts. For example, rather than a new account being established with a zero balance, the new account can be established with a predetermined balance, such as the real-time balance of an account previously associated with the subsidiary. Accordingly, a user would no longer have to manage a cash pool manually with spreadsheets. Instead, the account logic 110 provides this functionality to support a seamless transition, as accounts are on-boarded.

In addition to adding, moving, and deleting accounts, a user can also change the parameters of those accounts using the account logic 110. For example, a user can set interest rates for contributions and borrowings to and from the pool. Because the accounts may be subject to varying interest rates, the interest rates for the accounts can be individually set. Likewise, other parameters, including threshold settings for target balances, maximum contribution amounts, and borrowing limits can be set for one or more of the accounts. In this manner, accounts can be grouped together and subjected to specific parameters or alternatively, the parameters of the accounts can be set individually. Conversely, the account logic 110 may be used to set one or more parameters for all accounts in the pool.

The settlement logic 120 provides information regarding the performance of an account during a fiscal period. For example, the settlement logic 120 may use account information and transaction data according to predetermined performance metrics. In one embodiment, the settlement logic 120 provides account balances for the accounts at the end of the fiscal period. The account balances may be calculated by the settlement logic 120 based on the parameters set using the account logic 110. Accordingly, the settlement logic 120 may calculate the credits and debts of an account in the pool as those credits and debts pertain to other accounts in the pool.

Once the account balances are calculated by the settlement logic 120 for one or more accounts in the pool, different settlement options can be applied by either the pool structure logic 130 or the pool payment logic 140. Accordingly, the settlement logic 120 identifies a settlement option based at least in part on the calculation of account balances and selects the pool structure logic 130 or the pool payment logic 140 based on the identified settlement option. The identification of a settlement option by the settlement logic 120 may be based on predefined user preferences. For example, whether a user wishes to either post accruals or reporting and clearing accruals.

For example, if settlement changes the pool structure, the pool structure logic 130 provides an interface for making those changes. The pool structure provides multiple options for settling outstanding transactions when a pool structure is revised. A user may adjust the structure of the pool as needed while retaining pooling history with the account. Suppose that the pool structure is setup such that there are parent accounts and child accounts. The settlement logic 120 may selected the pool structure logic 130 to either make automated changes or allow a user to make manual changes to the pool structure. For example, a child account's pool balances may be moved with it when it moves to the new parent. Alternatively, the pool structure logic 130 may reset the pool balances of the moving child account back to zero. In another embodiment, the pool structure logic 130 may account for the money moving between the existing parent account and the child account, and between the child and the new parent, generating hard dollar transactions.

If instead, the settlement logic 120 identifies a settlement option that involves pool payments, the settlement logic 120 may select the pool payment logic 140 based on the identified settlement option. For example, consistent with the example above, assume that the pool structure is setup such that there are parent accounts and child accounts. The pool payment logic 140 may accrue and report the calculated balances but not settle the accounts or the pool payment logic 140 may also post the accruals. In another embodiment, the settlement logic 120 may select both the pool structure logic 130 and the pool payment logic 140 to perform multiple settlement options. Accordingly, the cash pooling tool 100 is an interface that provides users up to date tracking and allows for management of pooled accounts.

Figure 2:
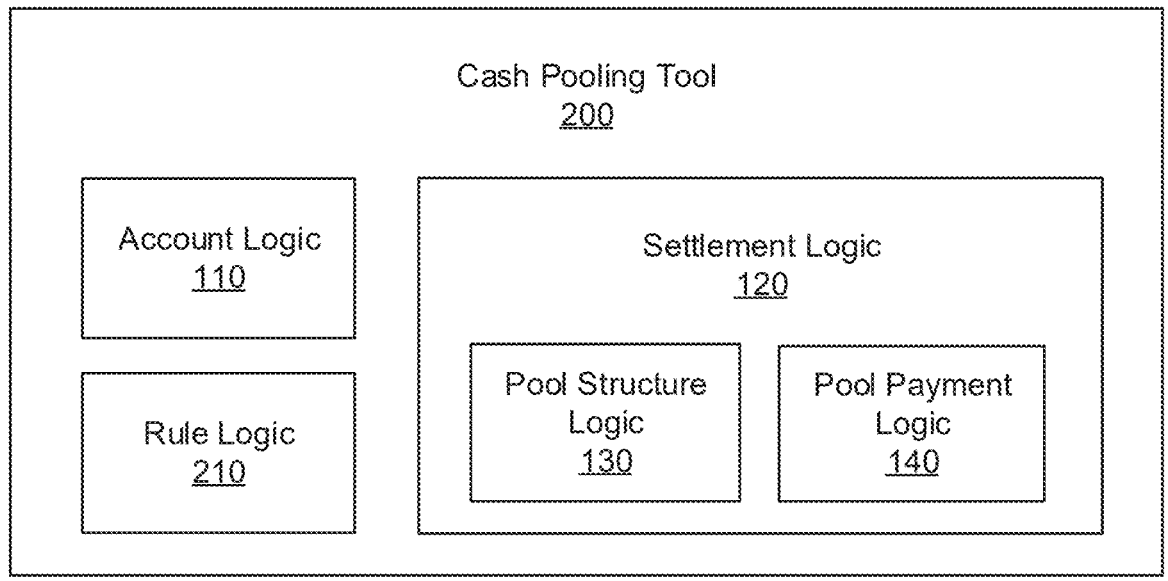
FIG. 2 illustrates one embodiment of a cash pooling tool associated with a rule logic.

FIG. 2 illustrates one embodiment of a cash pooling tool 200 associated with a rule logic 210. The cash pooling tool 200 operates in a similar manner as the cash pooling tool 100 described above with respect to FIG. 1. The cash pooling tool 200 includes an account logic 110, a settlement logic 120, a pool structure logic 130, and a pool payment logic 140, each of which also operates in a similar manner as described with respect to FIG. 1. The cash pooling tool 200 further includes a rule logic 210.

As discussed above with respect to FIG. 1, a user may set and change the parameters of accounts in the pool. These parameters may include limits that the user does not want the accounts to surpass. For example, a user may set a maximum borrowing amount for an account. The parameter may be set to disallow lowering of a child account's maximum borrowing amount to less than what that child account has currently borrowed. In response to a parameter being violated, such as the maximum borrowing rate, an error is generated by the rule logic 210.

In one embodiment, the error triggers item exception processing. For example, with respect to the maximum borrowing amount example, a manual exception approval process is triggered to pay individual items into overdraft. Accordingly, the rule logic 210 generates an error and may trigger a process of review by the user. The approval process may allow the user to either create an exception for the event that caused the violation of a parameter or rectify the event. Alternatively, the user may change the parameter using the account logic 110.

In one embodiment, the rule logic 210 provides an optional integration of a secondary approval process. For example, creating an exception for the event that caused the violation of a parameter or rectifying the event may require multiple users. For example, the rule logic 210 supports dual control so that different user can submit, approve, and/or reject cash pooling setups and account settings. Involving multiple users allows for multiple levels of security when dealing with accounts in the pool.

Figure 3:
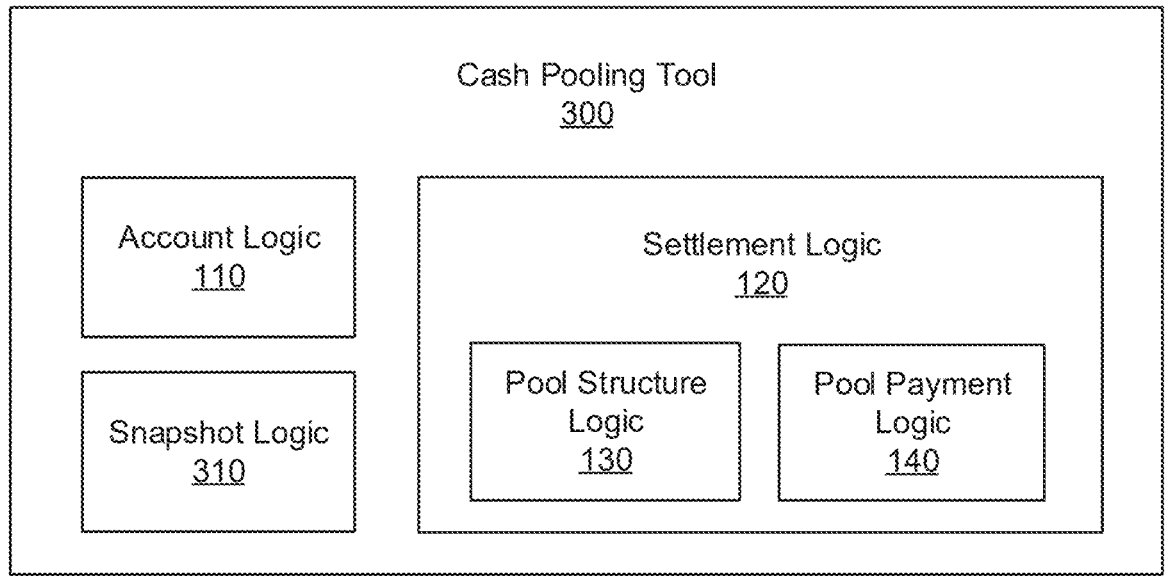
FIG. 3 illustrates one embodiment of a cash pooling tool associated with a snapshot logic.

FIG. 3 illustrates one embodiment of a cash pooling tool 300 associated with a rule logic 210. The cash pooling tool 300 operates in a similar manner as the cash pooling tool 100 described above with respect to FIG. 1. The cash pooling tool 300 includes an account logic 110, a settlement logic 120, a pool structure logic 130, and a pool payment logic 140, each of which also operates in a similar manner as described with respect to FIG. 1. The cash pooling tool 300 further includes a snapshot logic 310.

As discussed above, the settlement logic 120 provides account balances for the accounts at the end of the fiscal period. However, knowing the current account balances help users make informed decisions regarding their businesses and accounts. The snapshot logic 310 provides a snapshot of intraday balances across one or more accounts in the pooling structure. For example, a user can select one or more accounts from the pool using the snapshot logic 310. In response to those accounts being selected, the snapshot logic 310 calculates the balance for the one or more accounts. Likewise, the snapshot logic 310 may generate report illustrating the links between the one or more accounts. For example, the snapshot logic 310 may calculate the balances for one or more accounts and generate a report reflecting the parent account funding position.

Figure 4A:
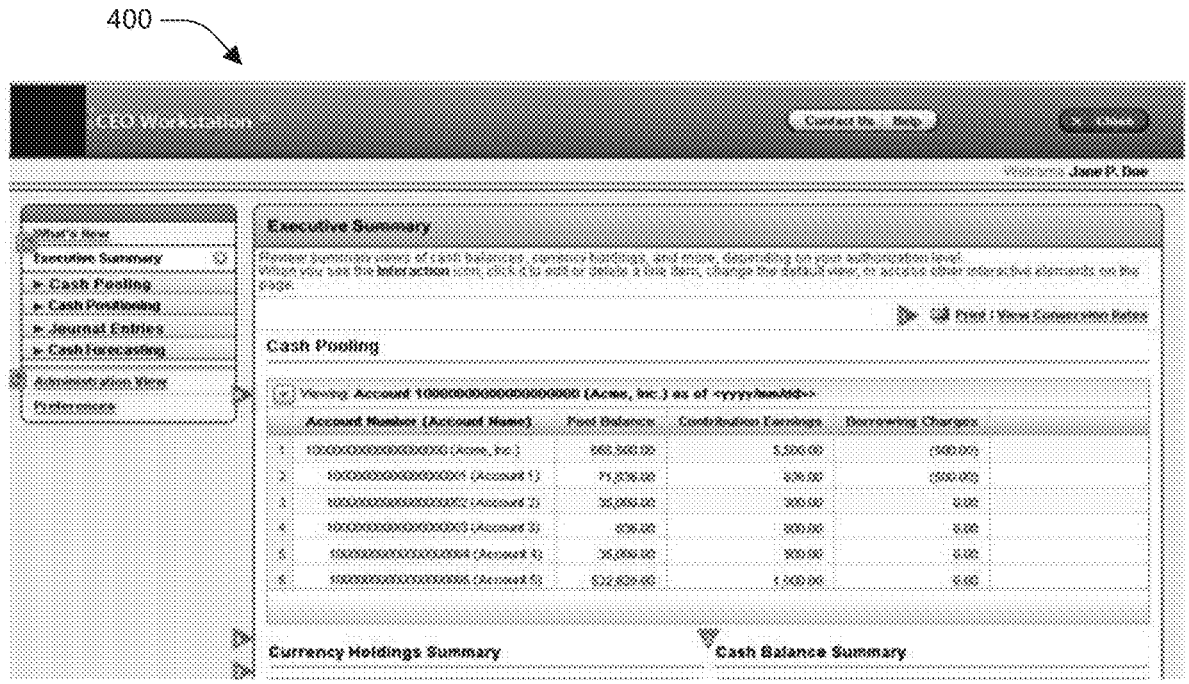
FIG. 4A illustrates one embodiment of an executive summary screen shot associated with a cash pooling tool.

FIG. 4A illustrates one embodiment of an executive summary screen shot 400 associated with a cash pooling tool, such as the cash pooling tool 100 described above with respect to FIG. 1. The executive summary screen shot 400 provides a dashboard view of summary data, including pool balance, currency holdings, cash balances, forecasting, loans, etc. Cash pooling summary data may be added to the executive summary screen shot 400 to provide a summary view for users using the cash pooling tool.

For example, a user may be authorized to view the executive summary screen shot 400 for at least one account in the pool. Parameters, such as contribution earnings and borrowing charges for that at least one account may be displayed. In one embodiment, the initial display is the highest level account in the pool to which the user is authorized and its direct child accounts, if available.

The user may select the section's context icon to present an Edit Display (not shown) overlay in which to modify the display criteria. The view may be edited by selecting an account from the Account Number dropdown and view data for the selected account and its direct child accounts, if available, or view data for an individual child account. Modified display criteria can be saved as the default view.

Figure 4B:
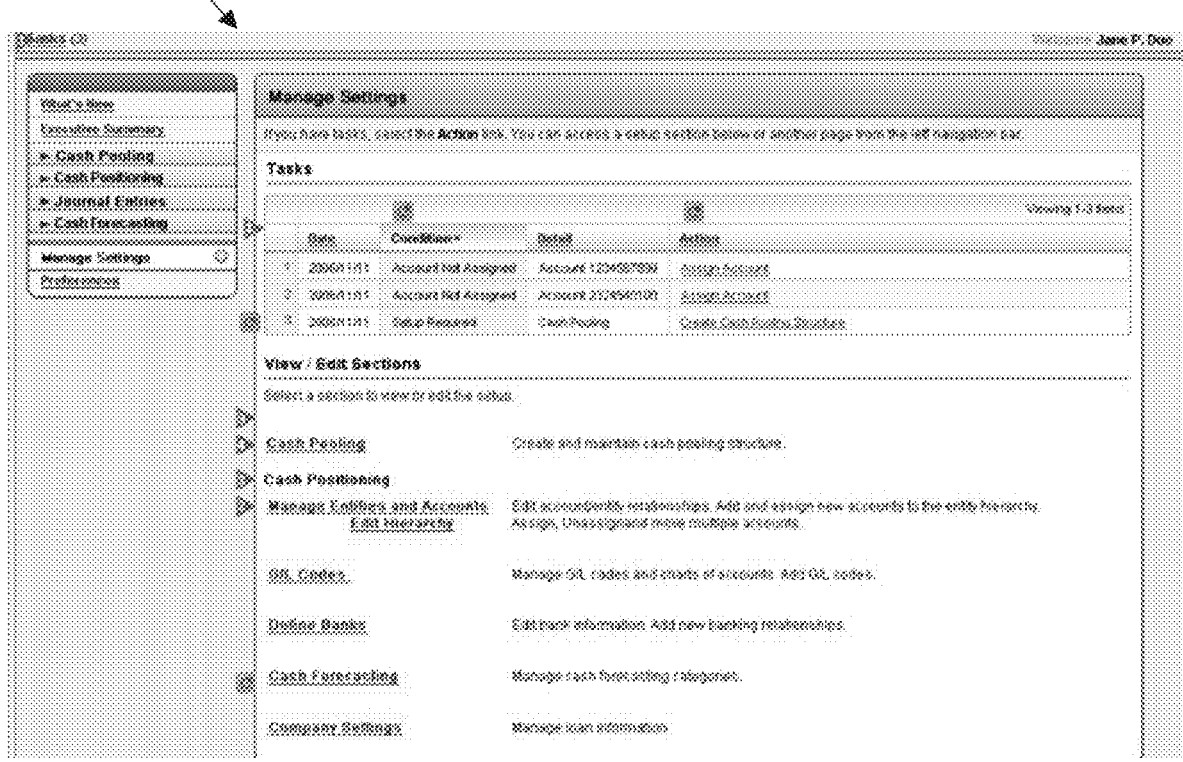
FIG. 4B illustrates one embodiment of a manage settings screen shot associated with a cash pooling tool.

FIG. 4B illustrates one embodiment of a manage settings screen shot 410 associated with a cash pooling tool. The manage settings screen shot 410 may be associated with a cash pooling tool, such as the cash pooling tool 100 described above with respect to FIG. 1, or more specifically the account logic 410. Specifically, the manage settings screen shot 410 is an interface that allows for the creation, movement, or deletion of parent and child account relationships for a cash pool. In addition to managing the existence of the accounts, from the manage settings screen shot 410 parameters for the accounts, including defining balances, rates and other settings for pooling accounts, can be set.

Once setup is complete, the manage settings screen shot 410 may be used for maintaining and updating an existing cash pooling structure. For example, the manage settings screen shot 410 may include a cash pooling section and a link only accessible by a user. In one embodiment, the user must be an authorized user in order to access the manage settings screen shot 410. For example, the authorized user must be authorized to access all cash pooling accounts for the company in order to facilitate setup.

Figure 5A:
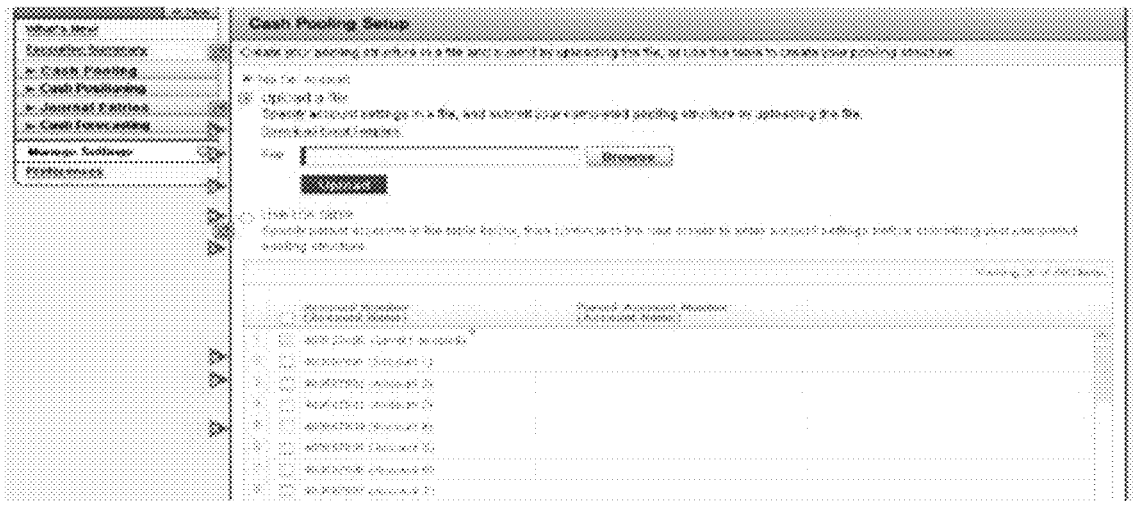
FIG. 5A illustrates one embodiment of a pool setup screen shot associated with a cash pooling tool.

FIG. 5A illustrates one embodiment of a pool setup screen shot associated with a cash pooling tool. As discussed above with respect to FIG. 4B, the manage settings screen shot 410 can be used to create an account in a pool. The second step in the process for creating an account is identifying how the new account fits into the pool structure. There are two options for creating the cash pool. In one embodiment, a file can be uploaded to the cash pooling tool. For example, a cash pooling structure and account settings may be created by using a spreadsheet template. Once completed, the template is uploaded to the cash pooling tool. Account settings data for the valid pooling structure also populate a cash pooling data table using the account setting logic 110 as described with respect to FIG. 1.

Alternatively, a cash pooling structure is created using a multi-step flow from the cash pooling tool. For example, the cash pooling tool may provide a cash pooling setup table to specify parent accounts and pooling settings for all accounts to be included in the pooling structure. Both options allow the selection of accounts to define parent/child account relationships within the pool structure and pooling settings for accounts in the structure. Parent accounts may have multiple child accounts.

Figure 5B:
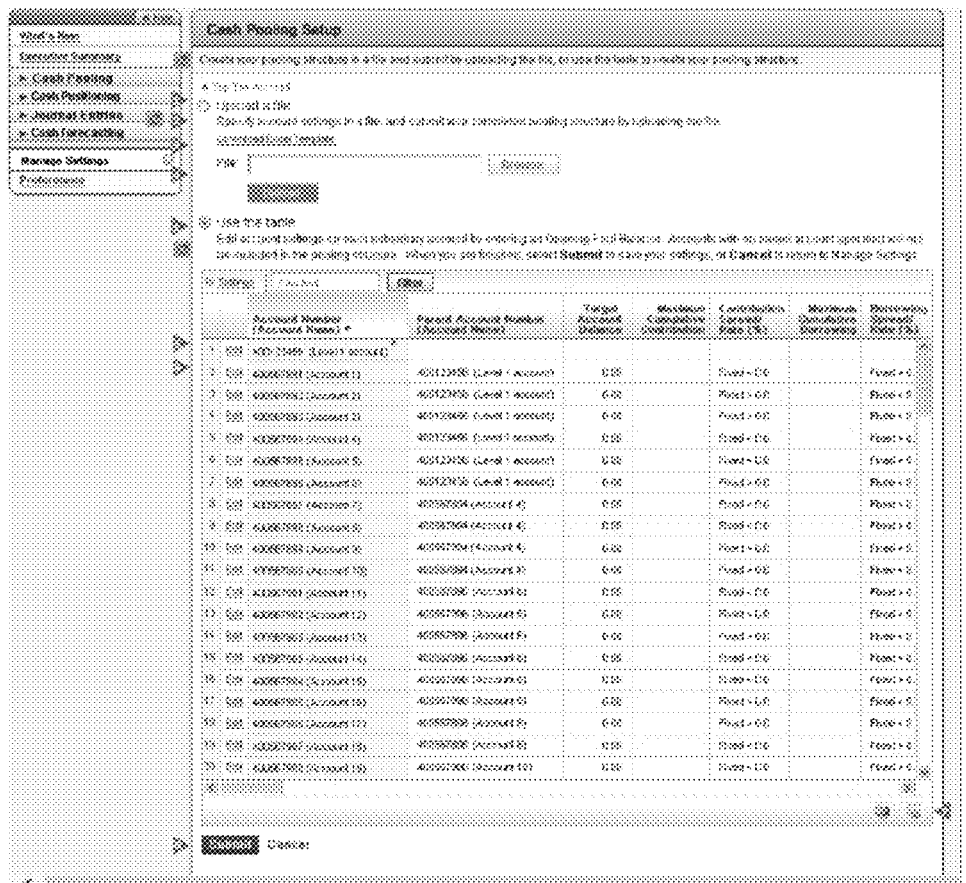
FIG. 5B illustrates one embodiment of an account details screen shot associated with a cash pooling tool.

FIG. 5B illustrates one embodiment of an account details screen shot associated with a cash pooling tool. As discussed above with respect to FIG. 1, a user can set and change details and parameters associated with the account. For example, a user can specify the pooling settings for each account. For example, a user can change the relationship (e.g., child, parent, etc.) between accounts. Once the desired changes are made, the account logic 110 may validate the entries based on the predetermined parameters.

Figure 6:
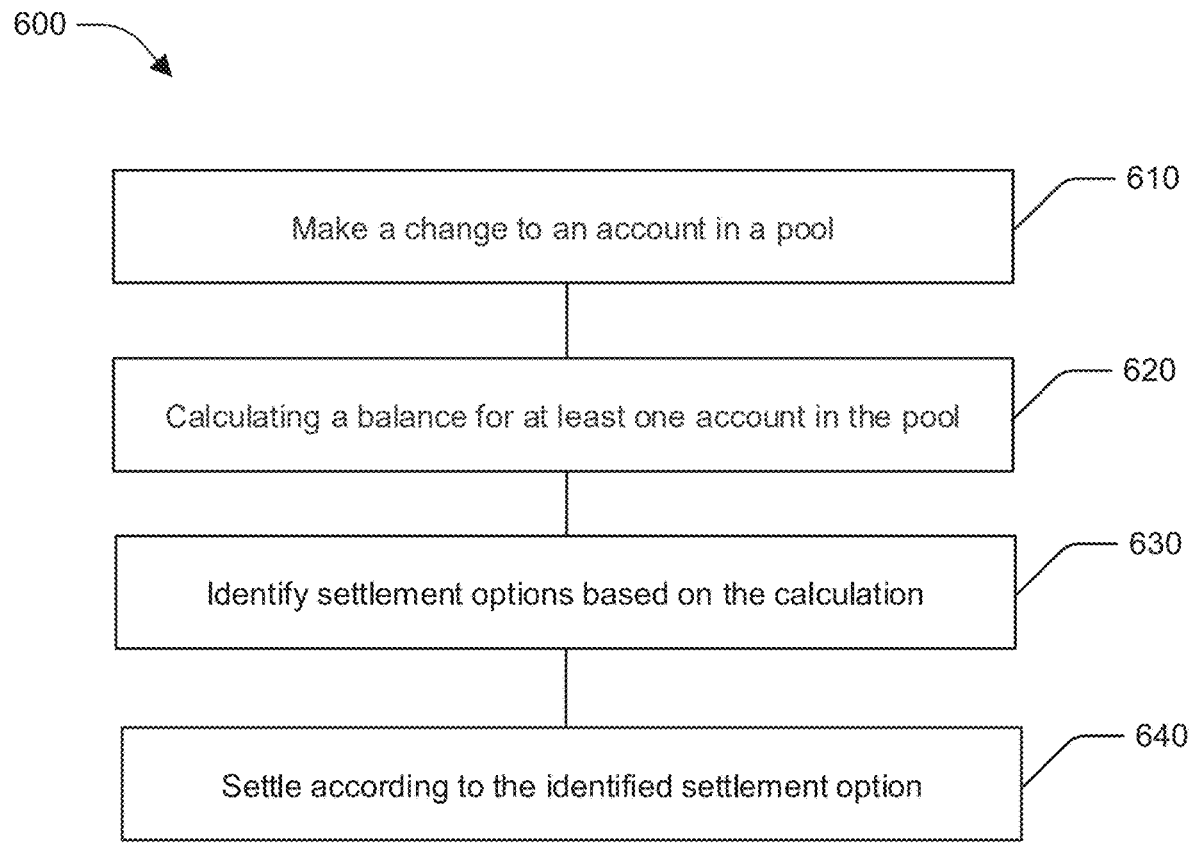
FIG. 6 illustrates one embodiment of a method associated with cash pooling tool.

FIG. 6 illustrates one embodiment of a method associated with a cash pooling tool. At 610, a user makes a change to an account in a pool. The change may include adding the account, moving the account, or making a change to parameters (e.g., threshold settings for target balances, maximum contribution amounts, borrowing limits, etc.). In one embodiment, the change is made using an interface such as the one illustrated in the manage settings screen shot discussed above with respect to FIG. 4B.

At 620, the change to at least one account in the pool causes at least one account to be rebalanced. In one embodiment, the change, causes the accounts to be rebalanced following at a predefined time, such as the end of a predetermined fiscal period. The balance(s) are calculated based, at least in part, on parameters including account information and transaction data according to predetermined performance metrics.

At 630, a settlement option is identified based at least in part on the rebalancing. Furthermore, the identification of a settlement option by the settlement logic 120 may be based on predefined user preferences. For example, whether a user wishes to either post accruals or reporting and clearing accruals. Suppose that a change that the user makes cases the pool structure to change. The identified settlement option may change the pool structure, which may further include adjusting parameters. At 640, the at least one account in the pool is settled.

Figure 7:
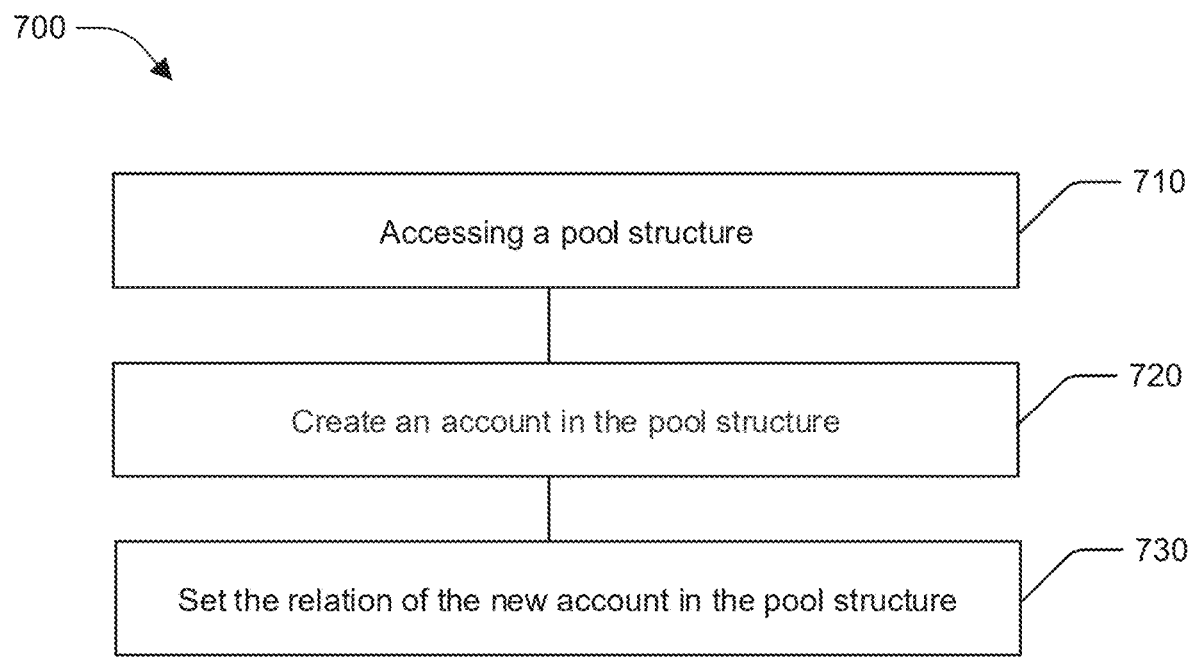
FIG. 7 illustrates one embodiment of a method associated with cash pooling tool.

FIG. 7 illustrates one embodiment of a method associated with cash pooling tool. At 710, a pool structure is accessed. The pool structure may be accessed using a cash pooling tool, such as the cash pooling tool 100 described with respect to FIG. 1.

At 720, a new account is created by the user for the pool structure. In one embodiment, the new account is created by uploading a file can be uploaded to the cash pooling tool. As discussed above, a cash pooling structure and account settings may be created by using a spreadsheet template. In another embodiment, a user interface may be provided to step a user through adding a new account, such as the account logic 110 described with respect to FIG. 1. The user having the ability to change the pooling structure using an interface gives the user flexibility to change the pooling structure to meet their financial needs.

At 730, the relation of the new account to the pool structure is set. Accordingly, the user has access to the functionality to specify the placement of the account in the pool. For example, the user can specify the parent and child accounts for the new account. By specifying the relationship of the new account to one or more accounts in the pool, one or more parameters of the new account may be set to correspond with the related accounts. Alternatively, a user can set and change details of the parameters associated with the account. For example, a user can specify the pooling settings for each account. For example, a user can change the relationship (e.g., child, parent, etc.) between accounts. Once the desired changes are made, the account logic 110 may validate the entries based on the predetermined parameters.

Figure 8:
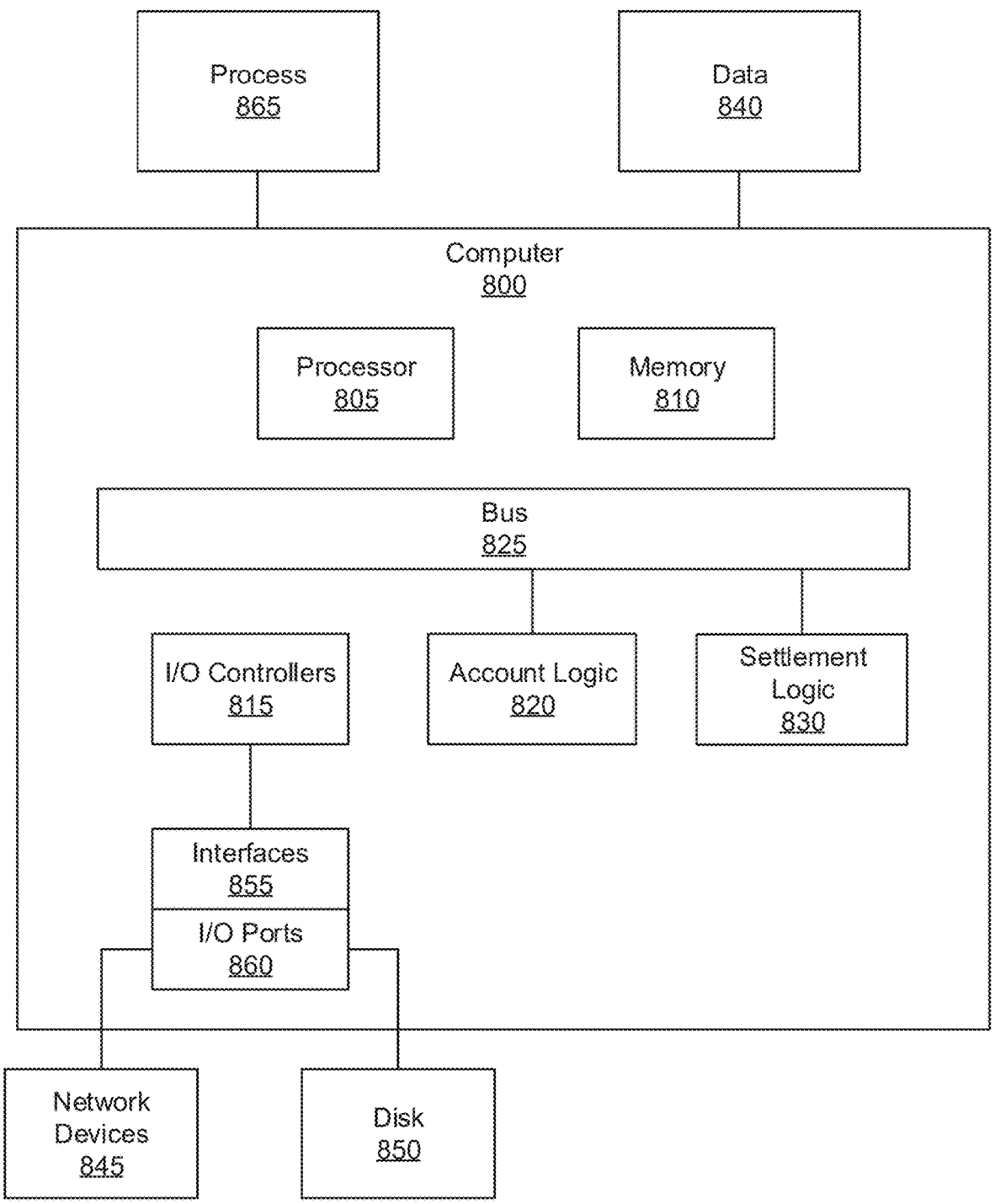
FIG. 8 illustrates one embodiment of an example computer environment associated with cash pooling.

FIG. 8 illustrates one embodiment of an example computer environment associated with cash pooling. The computer environment in which the systems and methods described herein, and equivalents, may operate may include a computer 800. The computer includes a processor 805, a memory 810, and input/output ports 860 operably connected by a bus 825. In one example, the computer 800 may include an account logic 820 and a settlement logic 830. The account logic 820 is configured to allow a user to make changes to accounts in the pool. For example, the account logic 820 enable a user to add, delete, or move an account. The account logic 820 also allows the user to make changes to the details of the account such as the parameters. The settlement logic 830 is configured to calculate balances for the accounts in the pool and identify one or more appropriate settlement options.

In different examples, the account logic 820 and the settlement logic 830 may be implemented in hardware, a non-transitory computer-readable medium with stored instructions, firmware, and/or combinations thereof. While the account logic 820 and the settlement logic 830 are illustrated as hardware components attached to the bus 825, it is to be appreciated that in one example, the account logic 820 and/or the settlement logic 830 could be implemented in the processor 805. Moreover, the parameters that may be changed by the account logic 820 may be stored tables in the memory 810.

In one embodiment, account logic 820 is a means (e.g., hardware, non-transitory computer-readable medium, firmware) for making changes to one or more accounts in a pool including changing the structure of the pool. The settlement logic 830 is a means (e.g., hardware, non-transitory computer-readable medium, firmware) for calculating balances for the accounts in the pool and identifying one or more appropriate settlement options. The means may also be implemented as stored computer executable instructions that are presented to computer 800 as data 840 that are temporarily stored in memory 810 and then executed by processor 805.

Generally describing an example configuration of the computer 800, the processor 805 may be a variety of various processors including a dual microprocessor and other multi-processor architectures. A memory 810 may include volatile memory and/or non-volatile memory. Non-volatile memory may include, for example, ROM, PROM, and so on. Volatile memory may include, for example, RAM, SRAM, DRAM, and so on.

A disk 850 may be operably connected to the computer 800 via, for example, an input/output interface (e.g., card, device) 855 and an input/output port 860. The disk 850 may be, for example, a magnetic disk drive, a solid state disk drive, a floppy disk drive, a tape drive, a Zip drive, a flash memory card, a memory stick, and so on. Furthermore, the disk 855 may be a CD-ROM drive, a CD-R drive, a CD-RW drive, a DVD ROM, and so on. The memory 810 can store a process 865 and/or a data 840, for example. The disk 850 and/or the memory 810 can store an operating system that controls and allocates resources of the computer 800.

The bus 825 may be a single internal bus interconnect architecture and/or other bus or mesh architectures. While a single bus is illustrated, it is to be appreciated that the computer 800 may communicate with various devices, logics, and peripherals using other buses (e.g., PCIE, 1394, USB, Ethernet). The bus 825 can be types including, for example, a memory bus, a memory controller, a peripheral bus, an external bus, a crossbar switch, and/or a local bus.

The computer 800 may interact with input/output devices via the i/o interfaces 855 and the input/output ports 860. Input/output devices may be, for example, a keyboard, a microphone, a pointing and selection device, cameras, video cards, displays, the network devices 845, the disk 850, and so on. The input/output ports 860 may include, for example, serial ports, parallel ports, and USB ports.

The computer 800 can operate in a network environment and thus may be connected to the network devices 845 via the i/o interfaces 855, and/or the i/o ports 860. Through the network devices 845, the computer 800 may interact with a network. Through the network, the computer 800 may be logically connected to remote computers. Networks with which the computer 800 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated, blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
   one or more processors coupled to a memory that includes instructions that, when executed by the one or more processors, cause the one or more processors to:
      set a parameter for a first account of a plurality of child accounts in a cash pool, the cash pool comprising a hierarchical structure comprising a parent account and the plurality of child accounts, one or more of the plurality of child accounts contributing funds to or borrowing funds from the parent account;
      effect a change to a second account of the plurality of child accounts in response to input received via a user interface;
      calculate a balance for the second account of the plurality of child accounts in the cash pool based on the change;
      determine a settlement option based on the balance of the second account, the parameter for the first account, and the change;
      automatically settle the second account according to the settlement option;
      generate an executive summary graphic that provides a dashboard view of data regarding one or more child accounts in the cash pool, the executive summary graphic based on the parameter of the first account and the balance of the second account; and
      provide the executive summary graphic for display via the user interface.

2. The system of claim 1, wherein the instructions, when executed by the one or more processors, further cause the one or more processors to generate an error and trigger item exception processing.

3. The system of claim 1, wherein the instructions, when executed by the one or more processors, further cause the one or more processors to generate a snapshot of intraday balances across one or more accounts in the cash pool.

4. The system of claim 1, wherein the instructions, when executed by the one or more processors, further cause the one or more processors to detect an additional account being added to the cash pool.

5. The system of claim 4, wherein the instructions, when executed by the one or more processors, further cause the one or more processors to establish an initial pooling position for the additional account.

6. The system of claim 4, wherein the instructions, when executed by the one or more processors, further cause the one or more processors to set a second parameter associated with the additional account.

7. The system of claim 6, wherein the second parameter is associated with details of the additional account, and wherein the second parameter is a threshold setting for an interest rate, a target balance, a maximum contribution amount, or a borrowing limit.

8. A method, comprising:
   setting, by one or more processors, a parameter for a first account of a plurality of child accounts in a cash pool, the cash pool comprising a hierarchical structure comprising a parent account and the plurality of child accounts, one or more of the plurality of child accounts contributing funds to or borrowing funds from the parent account;
   effecting, by the one or more processors, a change to a second account of the plurality of child accounts in response to input received via a user interface;
   calculating, by the one or more processors, a balance for the second account of the plurality of child accounts in the cash pool;
   determining, by the one or more processors, a settlement option based on the balance of the second account, the parameter for the first account, and the change;
   settling, by the one or more processors, the second account according to the settlement option;
   generating, by the one or more processors, an executive summary graphic that provides a dashboard view of data regarding one or more child accounts in the cash pool, the executive summary graphic based on the parameter of the first account and the balance of the second account; and
   providing, by the one or more processors, the executive summary graphic for display via the user interface.

9. The method of claim 8, further comprising generating, by the one or more processors, an error and trigger item exception processing.

10. The method of claim 8, further comprising generating, by the one or more processors, a snapshot of intraday balances across one or more accounts in the cash pool.

11. The method of claim 8, further comprising detecting, by the one or more processors, an additional account being added to the cash pool.

12. The method of claim 11, further comprising establishing, by the one or more processors, an initial pooling position for the additional account.

13. The method of claim 11, further comprising setting, by the one or more processors, a second parameter associated with the additional account.

14. The method of claim 13, wherein the second parameter is associated with details of the additional account, and wherein the second parameter is a threshold setting for an interest rate, a target balance, a maximum contribution amount, or a borrowing limit.

15. A non-transitory computer-readable medium with instructions embodied thereon that, when executed by one or more processors, cause the one or more processors to perform operations comprising:
   setting a parameter for a first account of a plurality of child accounts in a cash pool, the cash pool comprising a hierarchical structure comprising a parent account and the plurality of child accounts, one or more of the plurality of child accounts contributing funds to or borrowing funds from the parent account;
   effecting a change to a second account of the plurality of child accounts in response to input received via a user interface;
   calculating a balance for the second account of the plurality of child accounts in the cash pool based on the change;
   determining a settlement option based on the balance of the second account, the parameter for the first account, and the change;
   automatically settling the second account according to the settlement option;
   generating an executive summary graphic that provides a dashboard view of data regarding one or more child accounts in the cash pool, the executive summary graphic based on the parameter of the first account and the balance of the second account; and
   providing the executive summary graphic for display via the user interface.

16. The non-transitory computer-readable medium of claim 15, wherein the instructions, when executed by the one or more processors, cause the one or more processors to perform further operations comprising generating an error and trigger item exception processing.

17. The non-transitory computer-readable medium of claim 15, wherein the instructions, when executed by the one or more processors, cause the one or more processors to perform further operations comprising generating a snapshot of intraday balances across one or more accounts in the cash pool.

18. The non-transitory computer-readable medium of claim 15, wherein the instructions, when executed by the one or more processors, cause the one or more processors to perform further operations comprising detecting an additional account being added to the cash pool.

19. The non-transitory computer-readable medium of claim 18, wherein the instructions, when executed by the one or more processors, cause the one or more processors to perform further operations comprising establishing an initial pooling position for the additional account.

20. The non-transitory computer-readable medium of claim 18, wherein the instructions, when executed by the one or more processors, cause the one or more processors to perform further operations comprising setting a second parameter associated with the additional account, wherein the second parameter is associated with details of the additional account, and wherein the second parameter is a threshold setting for an interest rate, a target balance, a maximum contribution amount, or a borrowing limit.

* * * * *